United States Patent
Panteleev et al.

(10) Patent No.: US 12,063,657 B2
(45) Date of Patent: Aug. 13, 2024

(54) GROUPCAST AND UNICAST IN NEW RADIO VEHICLE-TO-EVERYTHING (V2X) COMMUNICATION

(71) Applicant: Apple Inc., Cupertino, CA (US)

(72) Inventors: Sergey Panteleev, Nizhny Novgorod (RU); Alexey Khoryaev, Nizhny Novgorod (RU); Mikhail Shilov, Nizhny Novgorod (RU)

(73) Assignee: Apple Inc., Cupertino, CA (US)

( * ) Notice: Subject to any disclaimer, the term of this patent is extended or adjusted under 35 U.S.C. 154(b) by 615 days.

(21) Appl. No.: 17/270,568

(22) PCT Filed: Sep. 26, 2019

(86) PCT No.: PCT/US2019/053103
§ 371 (c)(1),
(2) Date: Feb. 23, 2021

(87) PCT Pub. No.: WO2020/069088
PCT Pub. Date: Apr. 2, 2020

(65) Prior Publication Data
US 2021/0243796 A1    Aug. 5, 2021

Related U.S. Application Data

(60) Provisional application No. 62/739,055, filed on Sep. 28, 2018.

(51) Int. Cl.
*H04W 72/23* (2023.01)
*H04L 1/1812* (2023.01)
(Continued)

(52) U.S. Cl.
CPC ........... *H04W 72/23* (2023.01); *H04L 1/1812* (2013.01); *H04W 8/24* (2013.01); *H04W 72/566* (2023.01); *H04W 74/08* (2013.01)

(58) Field of Classification Search
CPC ..... H04W 72/23; H04W 8/24; H04W 72/566; H04W 74/08; H04W 84/005; H04W 4/40;
(Continued)

(56) References Cited

U.S. PATENT DOCUMENTS 9,210,689 B2    12/2015   Subramanian et al.
9,332,570 B2     5/2016   Lindoff et al.
(Continued)

FOREIGN PATENT DOCUMENTS

CN    101379782 B    1/2007
CN    104285402 B    1/2015
(Continued)

OTHER PUBLICATIONS

3GPP TSG RAN WG1 Meeting #94; R1-1808875; Source: OPPO; Title: Discussion of sidelink unicast, groupcast and broadcast for NR-V2X; Gothenburg, Sweden, Aug. 20-24, 2018. (Year: 2018).*
(Continued)

*Primary Examiner* — Mohammed S Chowdhury
(74) *Attorney, Agent, or Firm* — Eschweiler & Potashnik, LLC

(57) ABSTRACT

Systems, methods, and circuitries are provided for enhancing unicast and groupcast communication in a wireless communication system also utilizing broadcast communication. An example apparatus for a user equipment (UE) wireless communication device, including baseband circuitry having a radio frequency (RF) interface configured to transmit and receive RF signals, and one or more processors is provided. The one or more processors are configured to generate a signal encoding one or more capabilities of the UE wireless communication device and transmit the signal to one or more other UE wireless communication devices.

13 Claims, 3 Drawing Sheets

(51) Int. Cl.
*H04W 8/24* (2009.01)
*H04W 72/566* (2023.01)
*H04W 74/08* (2024.01)

(58) Field of Classification Search
CPC .... H04W 92/18; H04L 1/1812; H04L 1/1664; H04L 1/1854; H04L 1/1858; H04L 1/1822
See application file for complete search history.

(56) References Cited

U.S. PATENT DOCUMENTS

| | | | |
|---|---|---|---|
| 2009/0197629 | A1 | 8/2009 | Borran et al. |
| 2013/0230016 | A1 | 9/2013 | Lindoff |
| 2014/0185530 | A1 | 7/2014 | Kuchibhotla et al. |
| 2014/0241220 | A1 | 8/2014 | Choi et al. |
| 2014/0328241 | A1 | 11/2014 | Subramanian et al. |
| 2014/0334415 | A1 | 11/2014 | Borran et al. |
| 2016/0359589 | A1* | 12/2016 | Belleschi .............. H04L 1/1864 |
| 2017/0367059 | A1 | 12/2017 | Park et al. |
| 2018/0049220 | A1 | 2/2018 | Patil et al. |
| 2020/0029318 | A1* | 1/2020 | Guo ...................... H04L 1/1822 |
| 2020/0099479 | A1* | 3/2020 | Park ........................ H04W 4/70 |
| 2020/0305176 | A1* | 9/2020 | Hu ....................... H04B 7/0626 |
| 2021/0345360 | A1* | 11/2021 | Yeo ....................... H04W 72/20 |

FOREIGN PATENT DOCUMENTS

| | | |
|---|---|---|
| CN | 106063352 A | 10/2016 |
| CN | 107005509 A | 8/2017 |
| CN | 107852281 B | 3/2018 |
| CN | 107925906 A | 4/2018 |
| CN | 108400843 A | 8/2018 |
| CN | 108476390 A | 8/2018 |
| CN | 108028734 B | 11/2018 |
| CN | 104137573 A | 9/2021 |
| CN | 104823400 A | 9/2021 |
| CN | 105191178 A | 9/2021 |
| CN | 107852281 A | 9/2021 |
| JP | 2016-040855 A | 3/2016 |
| JP | 2017156602 A | 7/2017 |

OTHER PUBLICATIONS

Intel Corporation; "Evaluation of Uu interface for NR V2X"; 3GPP TSG-RAN WG2 Meeting 103bis; R2-1815015; Oct. 8, 2018.
Nokia; "Solutions to Latency Reduction for V2X Communication Systems Based on LTE"; Oct. 18, 2017.
Office Action received for Chinese Patent Application No. 202210580277.0, mailed Jul. 8, 2023, 5 pages including 1 pages English translation.
OPPO; Discussion of sidelink unicast, groupcast and broadcast for NR-V2X; 7.2.4.1.1; R1-1808875; 3GPP TSG RAN WG1 Meeting #94; Aug. 10, 2018.
Jiahui Qiu et al.; Research on Key Technologies and Evolution Strategies of IoV; "Designing Techniques of Posts and Telecommunications", Issue: 8; Aug. 20, 2017.
3rd Generation Partnership Project; Technical Specification Group Radio Access Network; NR; Physical layer procedures for control: (Release 15); 3GPP TS 38.213 V15.2.0; Jun. 2018.
International Search Report dated Mar. 18, 2020 for International Application No. PCT/US2019/053103.
International Preliminary Report on Patentability dated Mar. 23, 2021 for International Application No. PCT/US2019/053103.

* cited by examiner ional Patent Application No. 62/739,055 filed on Sep. 28, 2018,
GROUPCAST AND UNICAST IN NEW RADIO VEHICLE-TO-EVERYTHING (V2X) COMMUNICATION

CROSS REFERENCE TO RELATED APPLICATIONS

This application is a National Phase entry application of International Patent Application No. PCT/US2019/053103 filed Sep. 28, 2018, which claims priority to U.S. Provisentitled "SUPPORT OF UNICAST AND GROUPCAST IN NEW RADIO VEHICLE-TO-EVERYTHING," and is hereby incorporated by reference in its entirety.

BACKGROUND

Various examples generally may relate to the field of wireless communications.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various examples. However, it will be apparent to those skilled in the art having the benefit of the present disclosure that the various aspects of the various examples may be practiced in other examples that depart from these specific details. In certain instances, descriptions of well-known devices, circuits, and methods are omitted so as not to obscure the description of the various examples with unnecessary detail. For the purposes of the present document, the phrase "A or B" means (A), (B), or (A and B).

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various examples. However, it will be apparent to those skilled in the art having the benefit of the present disclosure that the various aspects of the various examples may be practiced in other examples that depart from these specific details. In certain instances, descriptions of well-known devices, circuits, and methods are omitted so as not to obscure the description of the various examples with unnecessary detail. For the purposes of the present document, the phrase "A or B" means (A), (B), or (A and B).

Figure 1:
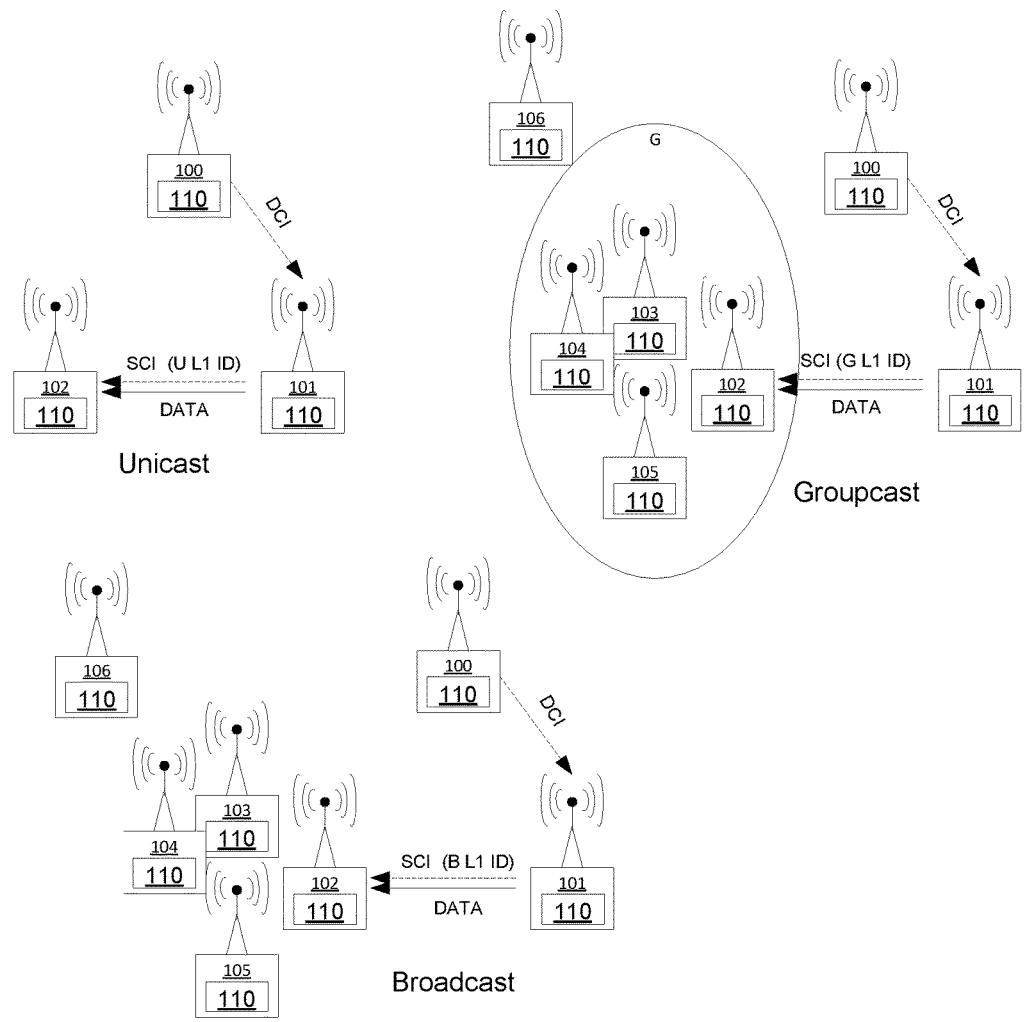
FIG. 1 depicts an exemplary wireless communication network in accordance with some examples.

FIG. 1 is a block diagram of a wireless communication network in which wireless communication devices use unicast, groupcast, and broadcast communication. Each device in the network includes vehicle-to-everything (V2X) circuitry 110 that includes one or more processors configured to perform various types of V2X communication. For the purposes of this description, when a "device" is described as performing some function, it can be understood that it is the processor(s) in the V2X circuitry that is performing the function. Example devices are illustrated in more detail in FIGS. 4 and 5.

A device (e.g., device 101) seeking to transmit data to another device(s) in the wireless communication network first determines sidelink channel resources that are available for this purpose. In Mode 1, the device requests sidelink channel resources from a manager device 100 that coordinates communication between the devices in the network. The manager device 100 may be a user equipment (UE) device or a base station device (gNB, eNB, and so on). The manager device provides downlink configuration information (DCI) to requesting devices that describes a manner in which sidelink control information (SCI) is exchanged between the devices in the network. The manager device 100 provides a Layer-1 Identifier (L1 ID) that uniquely identifies channels between the device 101 and a particular device (a unicast identifier), a group of devices (a groupcast identifier), or all devices (a broadcast identifier) in the wireless communication network. In Mode 2, the device selects sidelink channel resources (e.g., L1 ID) from a pool of pre-allocated resources rather than communicating with a manager device.

In the unicast example of FIG. 1, device 101 seeks to transmit data just to device 102. To enable this communication, the device 101 obtains a unicast L1 ID for the device 102 (from either a manager device as shown or from a pool of pre-allocated resources in Mode 2) that identifies a channel monitored by device 102 for SCI. Device 101 sends SCI using the resources associated with the L1 ID for device 102. The SCI instructs the device 102 how to subsequently receive data from device 101.

In the groupcast example of FIG. 1, device 101 seeks to transmit data to a group G that includes several devices 102, 103, 104, 105 (while only four devices are in the illustrated group, a different number may be in a group). A Groupcast L1 ID identifies a channel(s) monitored by devices in group G for SCI. To enable the groupcast communication, the device 101 determines the L1 ID for the group G (from either a manager device as shown or from a pool of pre-allocated resources in Mode 2). Device 101 sends SCI using the resources associated with the L1 ID for group G. The SCI instructs devices in group g how to subsequently receive data from device 101.

In the broadcast example of FIG. 1, device 101 seeks to transmit data to all devices in the network. A Broadcast L1 ID identifies a channel(s) monitored by all devices in the network for SCI. To enable the groupcast communication, the device 101 determines the broadcast L1 ID for the network (from either a manager device as shown or from a pool of pre-allocated resources in Mode 2). Device 101 sends SCI using the resources associated with the broadcast L1 ID for the network. The SCI instructs devices the network how to subsequently receive data from device 101.

It is expected that New Radio (NR) V2X communication systems will support a wide variety of use cases and deployment scenarios including basic safety message exchange, advanced driving applications, and extended sensor sharing. While basic safety applications may mostly reuse LTE channel access methods that are based on sensing performed at the TX side, more advanced applications may require channel access schemes based on a combination of TX-based and RX-based sensing to achieve higher data rates and reliability. These new use cases typically assume groupcast or unicast types of sidelink communication, in which the knowledge of intended message recipients may help in adapting TX and RX behavior to select optimal resources in terms of system capacity and link performance.

In broadcast systems there is no need for accurate characterization of intended receivers and respective propagation channels. Thus, in broadcast systems, the main approach for collision avoidance is transmitter-based channel sensing for resource selection. It is noted that this approach was adopted as the scheme for Rel.14 V2V communication in LTE. It is also noted that this approach does not directly ensure RX channel quality due to multiple challenges such as hidden node interference, in-band emission, and near-far problems.

The use of a TX-based channel sensing scheme for unicast and groupcast operation would substantially limit the achievable link reliability and spectrum efficiency due to the same problems (e.g., hidden node interference, in-band emissions, and near-far effects). It should be noted that the intended receiver/group of receivers for unicast and groupcast may be assumed to be known due to pre-association, authorization, discovery procedures at least from a higher layer perspective. Therefore, such types of links may employ a more advanced collision avoidance scheme based on a combination of TX-based and RX-based sensing.

Introduction of unicast links together with broadcast operation in the same spectrum requires considerations on seamless co-existence of both communication types. At the very least the introduction of unicast links into a broadcast system should not substantially degrade the performance of the broadcast system and/or the performance of the unicast system. Further, the broadcast system should not substantially degrade performance as compared to a unicast-only scenario. In order to ensure such co-existence, the distributed communication mode may be designed to take into account different types of links and may employ a unified channel sensing approach and control signaling design.

Described herein are systems, methods, and circuitries that facilitate the integration of unicast and groupcast communication with broadcast communication for V2V.

Unicast and Groupcast Handshaking Mechanisms

Figure 2:
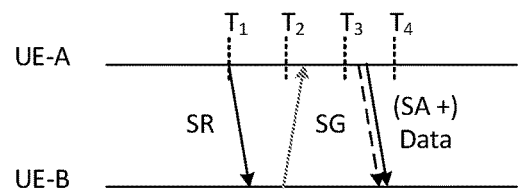
FIG. 2 depicts an exemplary unicast and groupcast handshaking process in accordance with some examples.

Referring to FIG. 2, in unicast communication mode, UEs may exploit so-called handshaking mechanisms in order to setup a radio layer related context for a communication session. The context may help to optimize communication link efficiency by adapting to channel quality conditions, interference, exchanging capability, and so on. The handshaking signals may at least include a scheduling request (SR) sent by a data source UE (UE-A) initiating transmission of unicast traffic and a scheduling grant (SG) sent by a receiving UE (e.g., UE-B) in response to the SR. A scheduling assignment (SA) followed by data is transmitted by UE-A in response to the SG.

Transmission of SR and SG may be performed in dedicated resources or resources shared with other physical channels and therefore may be subject to channel access procedures. The channel access procedure may exploit either listen-before-talk (LBT) based mechanism, or R14 V2V LTE-like sensing based on periodic traffic and resource reservation signals, or a combination thereof with additional enhancements.

Therefore, the transmission of SR and SG may need to take into account the channel access specifics. In one example, a synchronous LBT-like mechanism may be introduced in NR sidelink V2V communication. This allows the network to cope with potential collisions due to aperiodic traffic arrival. One attribute of this mechanism is an essentially random channel access time instance (randomization of transmission start time) which is a result of clear channel assessment and random backoff procedures.

In that context, the SR may be sent following the small-scale channel access procedure including CCA and random backoff. When SR transmission is successfully triggered, the SR may carry information about the reserved time resource range/interval where SG transmission is expected back from the UE-B and where the final data transmission is going to happen. This information may not only be used by the UE-B to send SG, it may also be used by other UEs which have detected the SR for deferring from transmission in the indicated resources.

The SG may either be sent in the resources reserved by the SR or in other resources still in the window known by UE-A. Both SR and SG may have fixed timing relationship T12=T2−T1 which is equal to or larger than a processing time defined for SR acquisition and SG preparation, e.g. denoted as NSR.

The handshaking procedure may be performed before each data transmission or before a group of data transmissions when context exchanged in SR/SG is valid for a period of time. In other words, all data transmissions laying into the period of SR/SG validity may be performed without additional SR/SG exchange.

In one example, the SR and SG may also carry information about capability of UEs. Alternatively, other messages preceding the SR/SG transmission, such as broadcast exchange messages, may be used to carry the radio-layer capability indication. The capabilities may include one or more of the following transmission and reception features: maximum transmission bandwidth, maximum transmission power, maximum number of supported MIMO layers, supported transmission durations including slot aggregation, maximum number of HARQ processes, supported waveform for PSSCH (if different options are possible), maximum processing and preparation times, maximum reception bandwidth, maximum number of supported RX MIMO layers, supported modulations (i.e. which subset from pi/2 BPSK, QPSK, 16-QAM, 64-QAM, 256-QAM, 1024-QAM), supported feedback and link adaptation modes, supported transmission modes, or supported V2X transmission profiles or profile IDs, and so on.

The above features/capabilities may be bundled as part of a profile in order to simplify signaling and UE implementation in handling different sets of features. The profile exchange may be done via SR/SG or broadcast messages, and may be addressed as an index of a particular profile. For example, there may be a few different profiles corresponding to regular, advanced, and limited UE capabilities. Each of these profiles may be commonly suitable for different services, e.g. sensor sharing, advanced driving, or platooning. In case the indication of features carried by SR is not suitable for a UE-B, the UE-B may respond in SG with another indication of features.

HARQ Feedback for Unicast and Groupcast

HARQ retransmission is a proven efficient way to increase spectrum efficiency of transmissions when a bidirectional link is established and low-overhead confirmation of successful or unsuccessful transmission is possible. The initial transmission may be performed using less spectrum resources based on the assumption that the transmission will be successful in most of the cases (e.g. in 90% cases with target error rate of 10% for initial TX) while the retransmission(s) may consume additional resources with sufficiently low probability (e.g. 10%).

Figure 3:
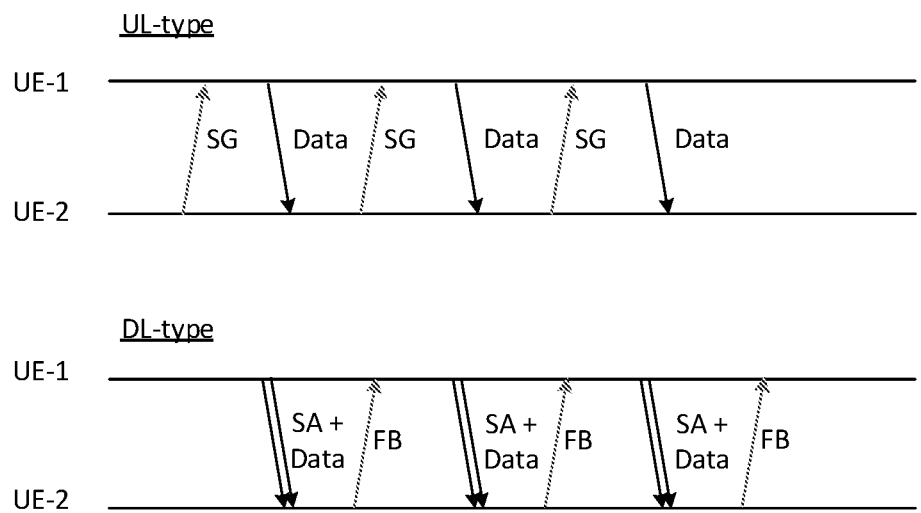
FIG. 3 depicts an exemplary sidelink hybrid automatic repeat request (HARQ) process in accordance with some examples.

In one example, to maintain flexibility and avoid fixed timing relationship between initial transmission and retransmissions, the retransmissions are asynchronous, i.e. explicitly addressed by HARQ process ID. The design of HARQ retransmission framework may largely depend on the type scheduling mode applied for unicast communication. Two main schemes of unicast communication, DL-type and UL-type, are envisioned (see FIG. 3):

In UL-type unicast communication, the receiving device (e.g., UE-2) transmits a scheduling grant to the data source device (e.g., UE-1). In this case, the HARQ feedback may be implicit in a manner similar to UL asynchronous scheduling where the New Data Indicator (NDI) is un-toggled in the scheduling grant to indicate NACK and the new parameters provided in the grant are used for retransmission of the same TB. Therefore, when a NDI is toggled it is considered as an ACK to the previous data transmission. This behavior does not rely on a fixed timing relation between data transmission and instead uses a grant employing the HARQ ID and NDI to address any failed transport block. Note that if the transmission is successful, the feedback is naturally omitted saving overhead.

In DL-type unicast communication the data source device (e.g., UE-1) transmits a scheduling assignment SA to the receiving device (e.g., UE-2). In this case, HARQ feedback may be provided by the receiving device in response to receiving a SA+data transmission. Since no full-blown control channel in reverse direction is expected, a separate feedback channel structure may be used. The feedback channel structure may be similar to the PUCCH transmission if no data in reverse direction is expected. Alternatively, the feedback channel may be similar to UCI piggybacking on PUSCH if a shared channel is planned to be used. Since transmissions may be subject to some sort of LBT procedures (refer to small-scale sensing), a fixed timing relation between TX and feedback, that is usually exploited in DL, may not be possible unless feedback resources are reserved. The reservation of resources for a feedback channel may be signaled in the SA in terms of slots as an offset to the time instance of PSSCH reception. The range of slot offsets for HARQ feedback signaling may be from 1 to K, where K is the maximum slot offset where the feedback may be signaled. Also, the slot offset should not be smaller than an associated PSSCH processing time that may also be defined separately e.g. as $N_{PSSCH}$ symbols.

In case of groupcast communication (i.e. one-to-many), it may also be beneficial to enable HARQ feedback although the number of recipients is more than one. In order to manage the feedback timing and potential collisions for different UEs, the feedback may only be sent in case of NACK in order to request retransmission. The resource for HARQ feedback in this case needs to be known from the original transmission either explicitly or implicitly.

In a general case, for the DL-type of HARQ retransmission and feedback, different transport options can be considered, including a physical sidelink control channel/sidelink control information (PSCCH/SCI) format, a MAC CE, or a dedicated physical sidelink feedback channel (PSFCH).

In the case of PSCCH/SCI format, a HARQ feedback may be carried by a different SCI format. This type of signaling may imply substantial overhead if not multiplexed with other useful information. Additionally, current polar code covers only the payload sizes of >11 bit that would lead to inefficient coding usage if the HARQ feedback size is smaller. This means that the redundant resource usage may not provide more reliability. However, such indication may still be used in some cases, (e.g. when multiplexed with other useful information such as CSI report, and so on).

As one alternative of piggybacking, acknowledgement of a PSSCH transmission may be carried as a MAC CE in a PSSCH of another direction. This approach would rely on a PSSCH being available for this MAC CE transmission. Further, the reliability of such feedback is dependent on MCS/resource allocation of the PSSCH used for transmission. This is because the whole transport block (TB) is decoded in order to extract the MAC CE.

A dedicated feedback channel (e.g., physical sidelink feedback channel (PSFCH)) structure may be defined so that the overhead to transmit a few bits is minimized. One suitable channel structure for this purpose is the flexible physical structure of PUCCH that is introduced in NR, which may be 1 or 2 symbols long, may carry 1, 2, or 4 bits, and be repeated in multiple slots. The sidelink design may adopt a sequence-based structure, and so on.

The dedicated feedback channel structure should also be subject to channel access procedures. That means that transmission of the channel should ensure that the channel does not collide with other channels of other UEs. For that purpose, the resource for PSFCH transmission may be reserved using control channel transmission scheduling PSSCH and having the scheduling PSSCH acknowledged by this PSFCH. It should be noted that such indication may be decoded by other UEs in proximity of the transmitting UE-A but may not be known by the UEs in proximity of the receiving UE-B. Therefore, an additional mechanism of informing UEs in proximity of UE-B may be needed.

Multiplexing of Inter-UE and Intra-UE Communication of Different Types

It is likely that services of different types (groupcast, unicast, broadcast) are mixed in a network. The channel access procedures need to seamlessly work with any mix of communication types. When unicast and broadcast services co-exist in the same spectrum and the unicast operation employs handshaking procedures, fairness of access to resources for a broadcast transmitter (UE-B-cast) and a unicast transmitter (UE-U-cast) may be different due to the additional resource reservation performed by the receiver of the unicast service. It could be argued that this is a natural consequence and there is no fairness issue. However, it may be beneficial to keep the same broadcast performance in some area if N broadcast transmitters are replaced by N unicast pairs.

In order to keep flexibility in realizing both co-existence paradigms, the following mechanisms may be considered. The channel access procedures and parameters may be specific to both priority defined by higher layers (e.g. per packet priority) and be specific to the service/communication features supported by a transmission (i.e., broadcast, unicast, groupcast). As an example, the following parameters may be configured based on supported features associated with a transmit signal in addition to being configured based on priority: energy/power thresholds (RSRP, RSSI), congestion control thresholds (CR, CBR), sets of parameters for resource allocation, transmission power, MCS, resource reservation window, resource selection window, and so on.

Unicast packets may be configured to be transmitted using either a broadcast channel access (i.e. without handshaking procedures, feedbacks, etc.) OR unicast-centric channel access (i.e. with handshaking procedure, feedbacks, etc.). Although the same channel access type (broadcast) may be used for unicast and broadcast communication, they may exploit different sets of parameters controlling the channel access procedures.

A priority offset may be introduced so that some service gets delta_p higher priority when taken into account in channel sensing procedures. For example, delta_p=1 may be configured to a broadcast service and delta_p=0 may be configured to a unicast service.

In the intra-UE case, it may be assumed that higher layers do some sort of filtering in order to select an appropriate radio access technique (RAT) and appropriate transport option for each packet. Even in that case, it may happen that packets for different communication types may be triggered for transmission or reception simultaneously.

A conflict of cellular packets (Uu) and sidelink packets (PC5 X-cast) may occur within a UE. In the case of PC5 RX to Uu TX conflict or PC5 TX-Uu TX conflicts, the Uu transmission in UL may be either always prioritized or conditionally prioritized using priority information. For example, if priority of PC5 reception/transmission is larger than a configured Priority_Threshold then the PC5 reception/transmission should be prioritized, and Uu transmission prioritized otherwise.

A conflict of PC5 groupcast/unicast packets with broadcast packets may occur within a UE. In this case, an implicit rule may be used so that B-cast TX is always prioritized over unicast TX or unicast RX based on an assumption that the broadcast services are usually safety related or mission critical. However, reception of broadcast may not be easily prioritized since there is no expected schedule for these messages known in advance.

Alternatively, a configured priority threshold/or communication type threshold may be introduced to decide whether to prioritize one communication type over another. A set of thresholds may be configured: $P_{U-B}$, $P_{U-G}$, $P_{G-B}$, where each threshold is used to resolve each pair of conflicts: $P_{U-B}$ for unicast and broadcast, $P_{U-G}$ for unicast and groupcast, $P_{G-B}$ for groupcast and broadcast. Different behavior may be applied for TX-TX conflicts and TX-RX conflicts, (i.e. by configuring another set of thresholds).

Power Control

Maximum power is usually assumed for broadcast communication where there is no characterization of propagation link quality. The maximum power may not be optimal for relatively short radio distance communication both in terms of energy consumption and interference injection to the network. For example, in a unicast/groupcast connection, excessive TX power settings may be avoided by adapting to target link channel attenuation which may be known from either large scale RRM measurements or from channel quality measurements.

The power control mechanisms considered in LTE and NR are usually classified into open loop power control (OLPC) and closed loop power control. Open loop power control involves setting the transmission power based on long-term measurements such as total channel attenuation or pathgain. For that purpose, PO and alpha settings are usually used. Note that it may still be possible to switch between different sets of OLPC parameters dynamically. In closed loop power control transmission power is adjusted based on short-term measurements of channel and interference variation.

In general, the TX power setting does not need to be known to the receiver side. The TX power may be adjusted in open loop manner based on channel quality feedback or sounding signals. Therefore, at least the closed loop power control may not be essential for unicast/groupcast sidelink communication. Then the open loop power control may be defined as an upper bound power that should not be exceeded by a transmitter during operation in order to co-exist with other carriers and services.

Another issue with arbitrary power control is the system level impact on channel access procedures. For example, if large-scale channel access with resource reservation is considered, the measurements may be performed assuming one TX power of UEs. During transmission and/or small scale channel access, the TX power of some UEs may change and thus may destruct the channel sensing decisions made with another TX power assumption. In order to prevent such system level issues, the TX power should be fixed during resource reservation period, if such reservation is adopted.

It can be seen from the foregoing description that groupcast and unicast communication between devices can be enhanced by using any or all of the described techniques.

Figure 4:
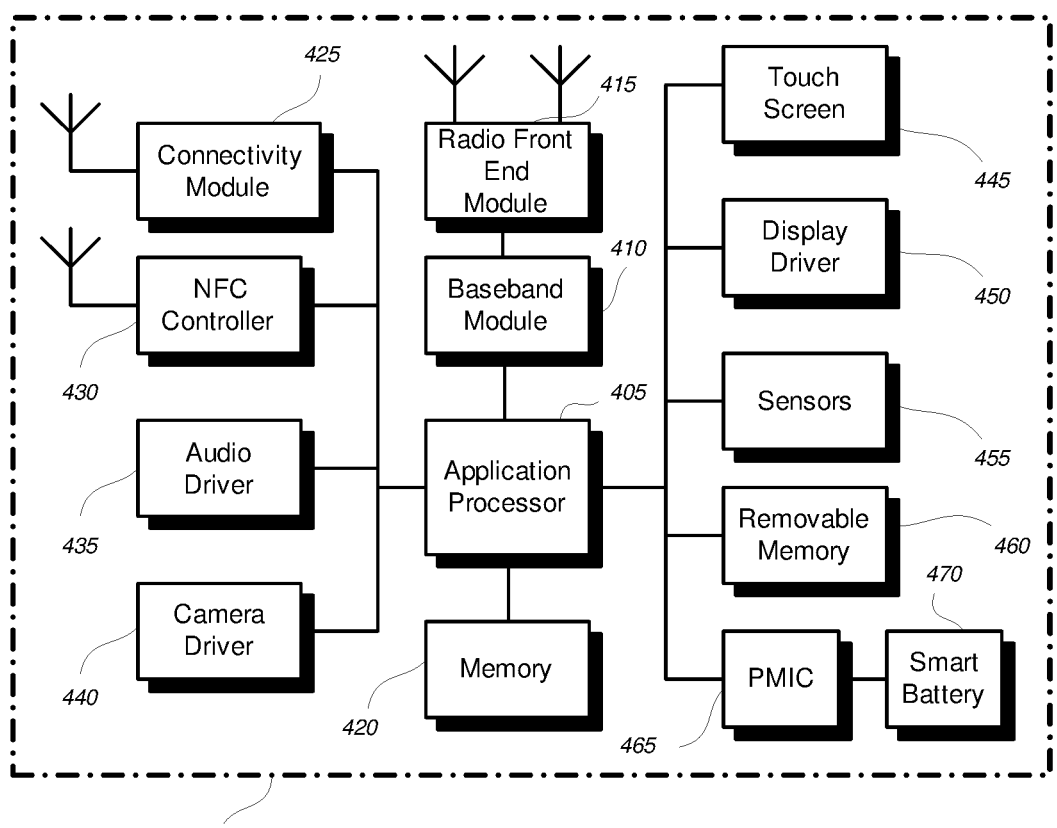
FIG. 4 illustrates a functional block diagram of an exemplary UE wireless communication device in accordance with some examples.

FIG. 4 illustrates a device 400 in accordance with an aspect. The user device 400 may be a mobile device or a UE in some aspects. The device 400 includes an application processor 405, baseband processor 410 (also referred to as a baseband module), radio front end module (RFEM) 415 (also referred to as a radio interface), memory 420, connectivity module 425, near field communication (NFC) controller 430, audio driver 435, camera driver 440, touch screen 445, display driver 450, sensors 455, removable memory 460, power management integrated circuit (PMIC) 465 and smart battery 470.

In some aspects, application processor 405 may include, for example, one or more CPU cores and one or more of cache memory, low drop-out voltage regulators (LDOs), interrupt controllers, serial interfaces such as serial peripheral interface (SPI), inter-integrated circuit (I2C) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 410 may be implemented, for example, as a solder-down substrate including one or more integrated circuits, a single packaged integrated circuit soldered to a main circuit board, and/or a multi-chip module containing two or more integrated circuits.

Figure 5:
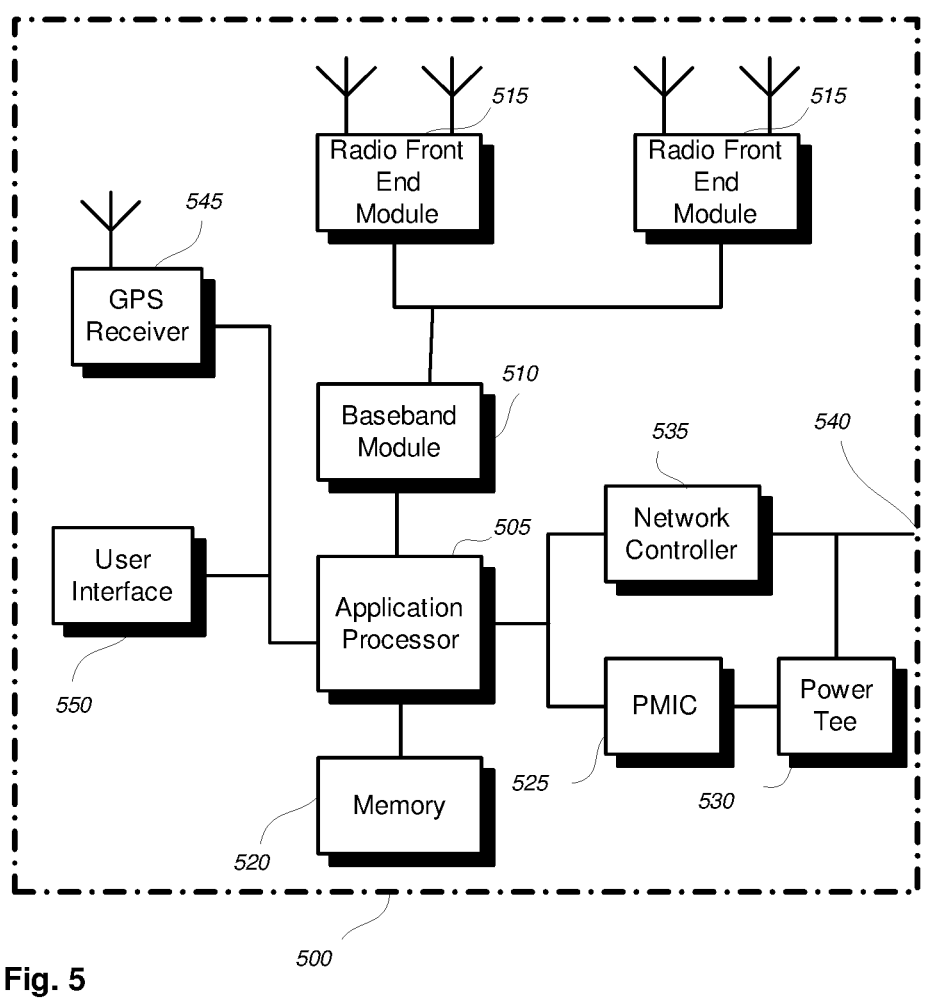
FIG. 5 illustrates a functional block diagram of an exemplary base station wireless communication device in accordance with some examples.

FIG. 5 illustrates an example base station or gNB/TRP/eNB 500 in accordance with an aspect. The eNB 500 may include one or more of application processor 505, baseband modules 510 (also referred to as baseband processors), one or more radio front end modules 515 (also referred to as a radio interface), memory 520, power management circuitry 525, power tee circuitry 530, network controller 535, network interface connector 540, satellite navigation receiver module 545, and user interface 550.

In some aspects, application processor 505 may include one or more CPU cores and one or more of cache memory, low drop-out voltage regulators (LDOs), interrupt controllers, serial interfaces such as SPI, I2C or universal programmable serial interface module, real time clock (RTC), timer-counters including interval and watchdog timers, general purpose 10, memory card controllers such as SD/MMC or similar, USB interfaces, MIPI interfaces and Joint Test Access Group (JTAG) test access ports.

In some aspects, baseband processor 510 may be implemented, for example, as a solder-down substrate including one or more integrated circuits, a single packaged integrated circuit soldered to a main circuit board or a multi-chip module containing two or more integrated circuits.

In some aspects, memory 520 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM) and/or a three-dimensional crosspoint memory. Memory 520 may be implemented as one or more of solder down packaged integrated circuits, socketed memory modules and plug-in memory cards.

In some aspects, power management integrated circuitry 525 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 530 may provide for electrical power drawn from a network cable to provide both power supply and data connectivity to the base station radio head 500 using a single cable.

In some aspects, network controller 535 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 545 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 545 may provide data to application processor 505 which may include one or more of position data or time data. Application processor 505 may use time data to synchronize operations with other radio base stations.

In some aspects, user interface 550 may include one or more of physical or virtual buttons, such as a reset button, one or more indicators such as light emitting diodes (LEDs) and a display screen.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

It will be understood that when an element is referred to as being "electrically connected" or "electrically coupled" to another element, it can be physically connected or coupled to the other element such that current and/or electromagnetic radiation can flow along a conductive path formed by the elements. Intervening conductive, inductive, or capacitive elements may be present between the element and the other element when the elements are described as being electrically coupled or connected to one another. Further, when electrically coupled or connected to one another, one element may be capable of inducing a voltage or current flow or propagation of an electro-magnetic wave in the other element without physical contact or intervening components. Further, when a voltage, current, or signal is referred to as being "applied" to an element, the voltage, current, or signal may be conducted to the element by way of a physical connection or by way of capacitive, electro-magnetic, or inductive coupling that does not involve a physical connection.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

For one or more examples, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 is an apparatus for a user equipment (UE) wireless communication device, including baseband circuitry having a radio frequency (RF) interface configured to transmit and receive RF signals, and one or more processors. The one or more processors are configured to generate a signal encoding one or more capabilities of the UE wireless communication device; and transmit the signal to one or more other UE wireless communication devices.

Example 2 includes the subject matter of example 1, including or omitting optional elements, wherein the signal includes a broadcast signal.

Example 3 includes the subject matter of example 1, including or omitting optional elements, wherein the signal includes a scheduling request (SR).

Example 3 includes the subject matter of example 1, including or omitting optional elements, wherein the signal includes a scheduling grant (SG).

Example 5 includes the subject matter of example 1, including or omitting optional elements, wherein the one or more capabilities include one or more of maximum transmission bandwidth, maximum transmission power, maximum number of supported multiple input multiple output (MIMO) layers, supported transmission durations including slot aggregation, maximum number of hybrid acknowledgement repeat request (HARQ) processes, supported waveform for physical sidelink shared channel (PSSCH), maximum processing and preparation times, maximum reception bandwidth, maximum number of supported RX MIMO layers, supported modulations, supported feedback and link adaption modes, supported transmission modes, or supported V2X transmission profiles.

Example 6 includes the subject matter of any one of examples 1-4, including or omitting optional elements, wherein the signal encodes a profile identifier that identifies a group of capabilities.

Example 7 includes the subject matter of example 6, including or omitting optional elements, wherein the profile identifier identifies a level of capability.

Example 8 is an apparatus for a first user equipment (UE) wireless communication device, including baseband circuitry having a radio frequency (RF) interface configured to transmit and receive RF signals, and one or more processors. The one or more processors are configured to transmit a signal encoding data to a second UE wireless communication device; identify a hybrid automatic repeat request (HARQ) process identifier (ID) associated with the signal; determine, based on the HARQ process ID, a feedback signal; monitor for the feedback signal; and selectively re-transmit the signal in response to receiving the feedback signal.

Example 9 includes the subject matter of example 8, including or omitting optional elements, wherein the one or more processors are configured to transmit the signal in response to receiving a scheduling grant (SG) having a new data indicator (NDI) bit toggled from the second UE wireless device; determine that the HARQ process ID specifies the SG as the feedback signal; and re-transmit the signal in response to receiving a subsequent SG having the NDI bit un-toggled.

Example 10 includes the subject matter of example 8, including or omitting optional elements, wherein the one or more processors are configured to determine that the HARQ process ID indicates that feedback is received in a dedicated feedback channel structure including resources reserved for the feedback signal; prior to transmitting the signal, transmit a scheduling assignment (SA) to the second UE wireless device that includes information describing the dedicated feedback channel structure; and monitor the dedicated feedback channel structure for the feedback signal.

Example 11 includes the subject matter of example 10, including or omitting optional elements, wherein the dedicated feedback channel structure includes a physical sidelink feedback channel (PFSCH), further wherein the one or more processors are configured to generate the SA to include information defining a number of symbols, a number of bits per symbol, and a number of slots in the PSFCH for repeating the feedback signal.

Example 12 includes the subject matter of example 10, including or omitting optional elements, wherein the one or more processors are configured to determine an offset associated with the HARQ process ID, wherein the offset defines a number of slots with respect to a physical sidelink shared channel (PSSCH); and monitor for the feedback signal at slots occurring after the offset.

Example 13 includes the subject matter of example 12, including or omitting optional elements, wherein the number of slots is greater than a PSSCH processing time.

Example 14 includes the subject matter of example 10, including or omitting optional elements, wherein the dedicated feedback channel structure includes a subset of a physical uplink control channel (PUCCH).

Example 15 includes the subject matter of any one of examples 8-14, including or omitting optional elements, the one or more processors are configured to refrain from re-transmitting the signal in response to not receiving the feedback signal; and re-transmit the signal in response to receiving the feedback signal, wherein the feedback signal includes a non-acknowledgement (NACK) signal.

Example 16 is an apparatus for a first user equipment (UE) wireless communication device, including baseband circuitry having a radio frequency (RF) interface configured to transmit and receive RF signals, and one or more processors. The one or more processors are configured to determine a first set of supported features associated with a first transmit signal; determine a second set of supported features associated with a second transmit signal; determine either a broadcast channel access or a unicast channel access for the first transmit signal based on the first set of supported features; and determine either a broadcast channel access or a unicast channel access for the second transmit signal based on the second set of supported features.

Example 17 includes the subject matter of example 16, including or omitting optional elements, wherein the one or more processors are configured to configure, based on the first set of supported features and the second set of supported features, one or more of an energy/power threshold for reference signal receive power (RSRP) or received signal strength indicator (RSSI), congestion control thresholds for communication range (CR) or channel busy ratio (CBR), sets of parameters for resource allocation, transmission power, modulation coding scheme, resource reservation window, or resource selection window.

Example 18 includes the subject matter of example 16, including or omitting optional elements, wherein the one or more processors are configured to determine a unicast channel access for the first transmit signal; adapt physical layer parameters in the broadcast channel access to generate an adapted channel access; and transmit the first transmit signal using the adapted channel access.

Example 19 includes the subject matter of any one of examples 16-18, including or omitting optional elements, wherein the one or more processors are configured to determine a first priority for the first transmit signal based on a channel sensing procedure; determine a second priority for the second transmit signal based on the channel sensing procedure; adjust the first priority based on the first set of supported features; adjust the second priority based on the second set of supported features; and transmit the first transmit signal and the second transmit signal according to the adjusted first priority and the adjusted second priority.

Example 20 includes the subject matter of example 19, including or omitting optional elements, wherein the one or more processors are configured to assign a higher priority to a transmit signal having a set of supported features corresponding to a cellular communication signal as compared to a transmit signal having a set of supported features corresponding to a PC5 communication signal.

Example 21 includes the subject matter of example 19, including or omitting optional elements, wherein the one or more processors are configured to assign a higher priority to a transmit signal having a set of supported features corresponding to a broadcast PC5 signal as compared to a transmit signal having a set of supported features corresponding to a non-broadcast PC5 signal.

Example 22 includes the subject matter of example 19 including or omitting optional elements, wherein the one or more processors are configured to determine a first priority assigned to the first transmit signal, wherein the first set of supported features corresponds to a broadcast signal; determine a second priority assigned to the second transmit signal, wherein the second set of supported features corresponds to a unicast signal; identify a unicast-broadcast threshold associated with the first transmit signal and the second transmit signal; determine whether a difference between the second priority and the first priority exceeds the unicast-broadcast threshold; and prioritize the second transmit signal above the first transmit signal when the difference exceeds the unicast-broadcast threshold.

Example 23 includes the subject matter of example 19, including or omitting optional elements, wherein the one or more processors are configured to determine a first priority assigned to the first transmit signal, wherein the first set of supported features corresponds to a broadcast signal; determine a second priority assigned to the second transmit signal, wherein the second set of supported features corresponds to a groupcast signal; identify a groupcast-broadcast threshold associated with the first transmit signal and the second transmit signal; determine whether a difference between the second priority and the first priority exceeds the groupcast-broadcast threshold; and prioritize the second transmit signal above the first transmit signal when the difference exceeds the groupcast-broadcast threshold.

Example 24 includes the subject matter of example 19, including or omitting optional elements, wherein the one or more processors are configured to determine a first priority assigned to the first transmit signal, wherein the first set of supported features corresponds to a groupcast signal; determine a second priority assigned to the second transmit signal, wherein the second set of supported features corresponds to a unicast signal; identify a unicast-groupcast threshold associated with the first transmit signal and the second transmit signal; determine whether a difference between the second priority and the first priority exceeds the unicast-groupcast threshold; and prioritize the second transmit signal above the first transmit signal when the difference exceeds the unicast-groupcast threshold.

Example 25 includes the subject matter of example 19, including or omitting optional elements, wherein the one or more processors are configured to determine a first priority assigned to the first transmit signal, wherein the first set of supported features corresponds to a groupcast signal; determine a second priority assigned to a receive signal; identify a transmit-receive threshold associated with the first transmit signal and the second transmit signal; determine whether a difference between the second priority and the first priority exceeds the transmit-receive threshold; and prioritize the second transmit signal above the first transmit signal when the difference exceeds the transmit receive threshold.

Any of the above described examples may be combined with any other example (or combination of examples), unless explicitly stated otherwise. The foregoing description of one or more implementations provides illustration and description, but is not intended to be exhaustive or to limit the scope of examples to the precise form disclosed. Modifications and variations are possible in light of the above teachings or may be acquired from practice of various examples.

We claim:

1. A baseband processor configured to perform operations, comprising:
   causing transmission of a physical sidelink control channel (PSCCH) signal and a physical sidelink shared channel (PSSCH) signal encoding a data transmission to a receiving user equipment (UE), wherein the PSCCH signal indicates resources for a physical sidelink feedback channel (PSFCH) and a slot offset for the PSFCH, wherein the slot offset indicates a number of slots with respect to reception of the PSSCH signal, wherein the slot offset is selected as greater than a separately indicated PSSCH processing time for the receiving UE;

receiving a PSFCH signal from the receiving UE on the indicated resources, wherein the PSFCH signal encodes feedback associated with the PSSCH signal; and selectively causing re-transmission of the data transmission based on the PSFCH signal.

2. The baseband processor of claim 1, wherein the operations comprise
refraining from causing the re-transmission of the data transmission in response to not receiving a subsequent PSFCH signal.

3. The baseband processor of claim 1, wherein the operations comprise, when the PSSCH signal and the PSCCH signal are transmitted to a plurality of UEs, including the receiving UE,
refraining from causing the re-transmission of the data transmission in response to not receiving a subsequent PSFCH signal.

4. The baseband processor of claim 1, wherein the operations comprise generating the PSCCH signal to indicate a number of symbols, a number of bits per symbol, and a number of slots in the PSFCH.

5. The baseband processor of claim 1, wherein the PSCCH signal comprises sidelink control information (SCI).

6. The baseband processor of claim 1, wherein the operations comprise causing the re-transmission of the data transmission when the PSFCH signal corresponds to a negative acknowledgment.

7. The baseband processor of claim 1, wherein the operations comprise, when the PSSCH signal and the PSCCH signal are transmitted to a plurality of UEs, including the receiving UE, causing the re-transmission of the data transmission when the PSFCH signal corresponds to a negative acknowledgment.

8. A receiving user equipment (UE), comprising a memory and a baseband processor configured to, when executing instructions stored in the memory, cause the receiving UE to:

receive a physical sidelink shared channel (PSSCH) signal encoding a data transmission and a physical sidelink control channel (PSCCH) signal from a transmitting UE, wherein the PSCCH signal indicates resources for a physical sidelink feedback channel (PSFCH) and a slot offset, wherein the slot offset indicates a number of slots with respect to reception of the PSSCH signal, wherein the slot offset is selected as greater than a separately indicated PSSCH processing time for the receiving UE;

in response to successfully receiving the PSSCH signal, refrain from transmitting a PSFCH signal; or in response to not successfully receiving the PSSCH signal, transmit a PSFCH signal encoding a negative acknowledgment on the indicated resources for the PSFCH.

9. The receiving UE of claim 8, wherein the PSCCH signal indicates a number of symbols, a number of bits per symbol, and a number of slots in the PSFCH.

10. The receiving UE of claim 8, wherein the PSCCH signal comprises sidelink control information (SCI).

11. A baseband processor for a receiving user equipment (UE) configured to perform operations comprising:

receiving a physical sidelink shared channel (PSSCH) signal encoding a data transmission and a physical sidelink control channel (PSCCH) signal from a transmitting UE, wherein the PSCCH signal indicates resources for a physical sidelink feedback channel (PSFCH) and a slot offset, wherein the slot offset indicates a number of slots with respect to reception of the PSSCH signal, wherein the slot offset is selected as greater than a separately indicated PSSCH processing time for the receiving UE;

in response to successfully receiving the PSSCH signal, refraining from transmitting a PSFCH signal; or in response to not successfully receiving the PSSCH signal, transmitting a PSFCH signal encoding a negative acknowledgment on the indicated resources for the PSFCH.

12. The baseband processor of claim 11, wherein the PSCCH signal indicates a number of symbols, a number of bits per symbol, and a number of slots in the PSFCH.

13. The baseband processor of claim 11, wherein the PSCCH signal comprises sidelink control information (SCI).

* * * * *